March 24. 1970     J. K. MACOMBER     3,502,406
PROJECTION READER
Filed July 19, 1966                                4 Sheets-Sheet 1
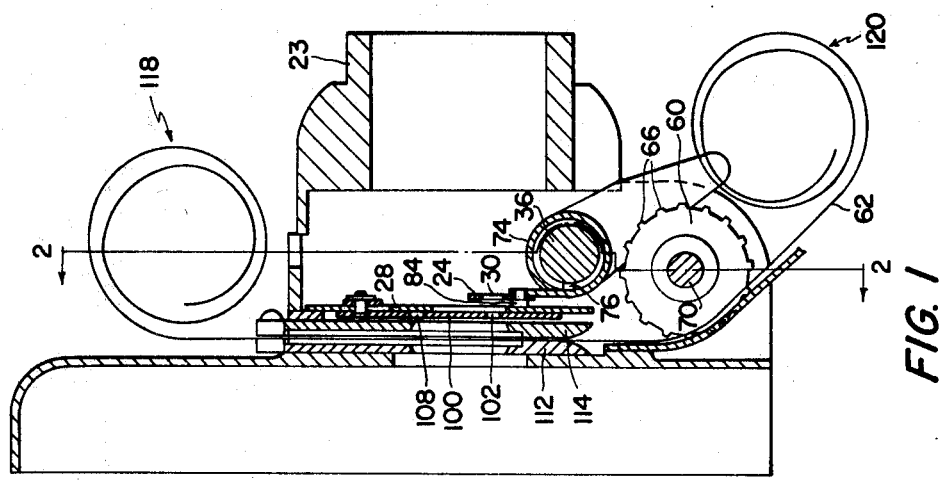
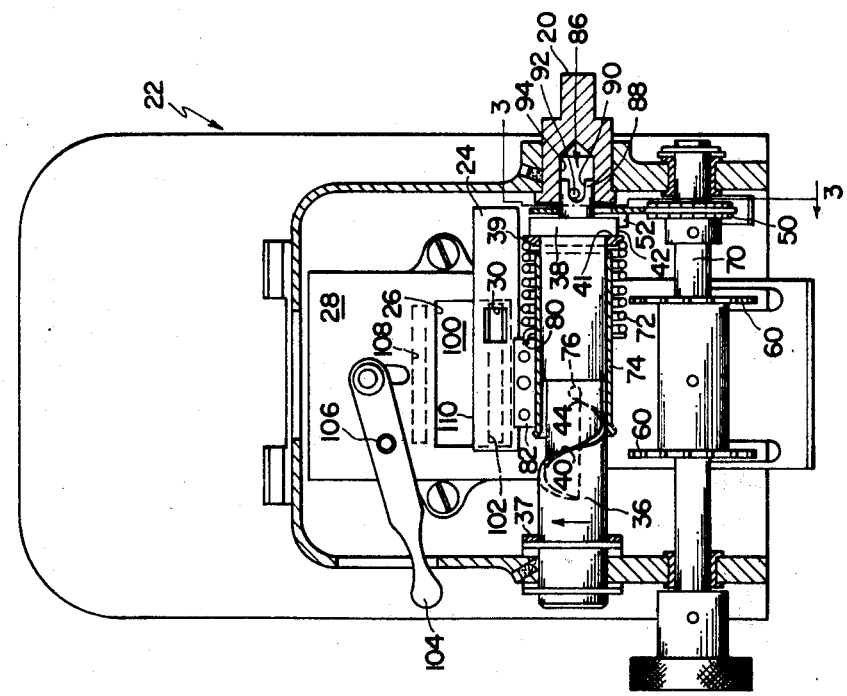
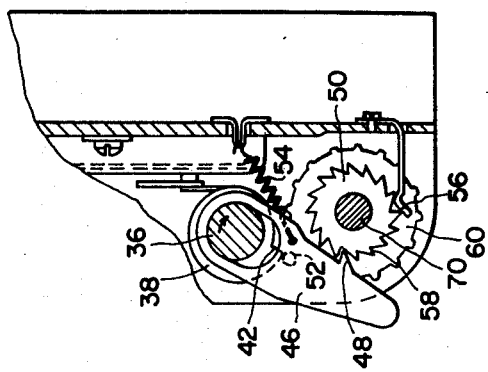
INVENTOR.
JAMES KEITH MACOMBER
BY
*Edward Halle*
ATTORNEY.

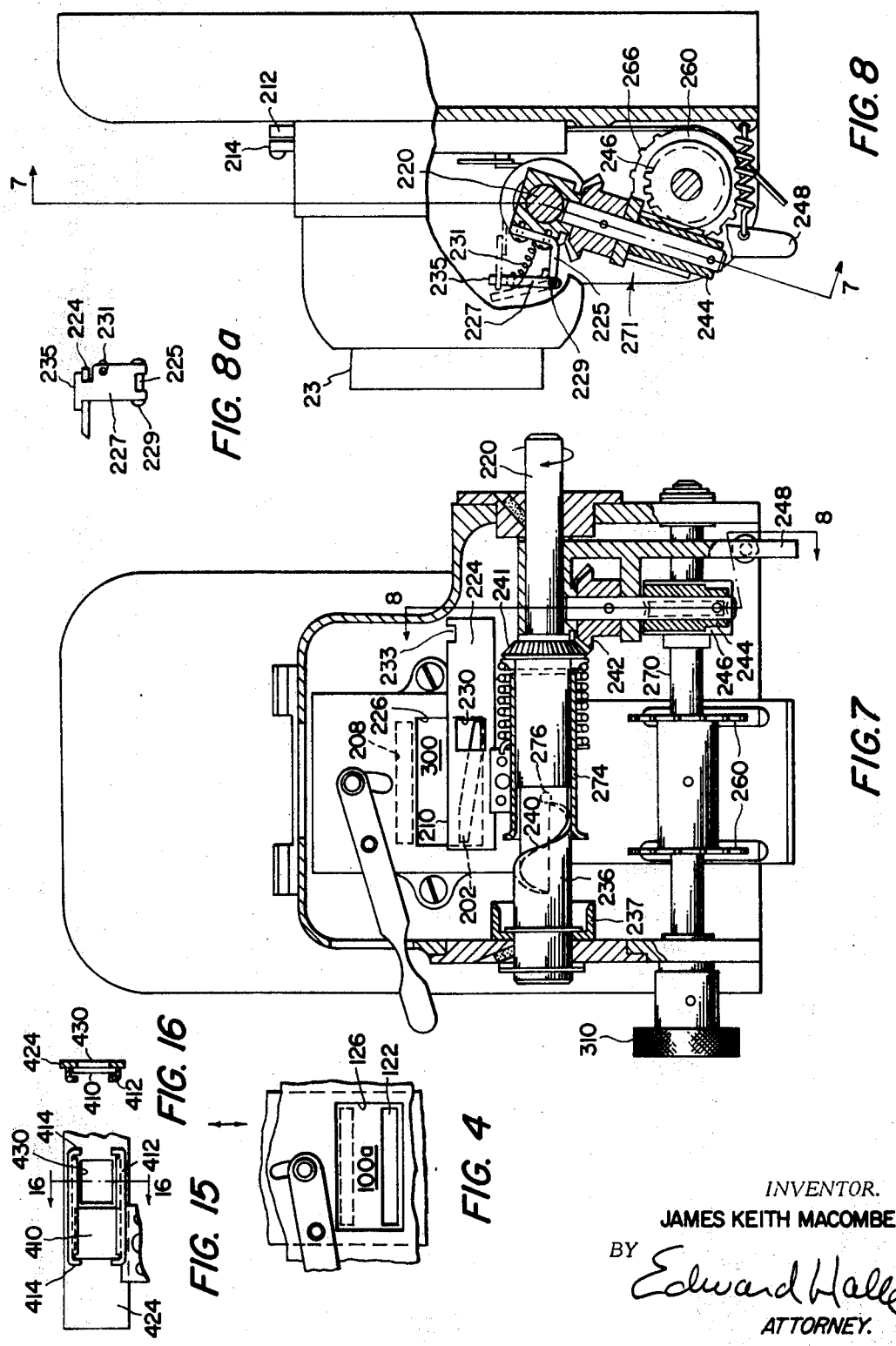

March 24, 1970      J. K. MACOMBER      3,502,406

PROJECTION READER

Filed July 19, 1966      4 Sheets-Sheet 3

INVENTOR.
JAMES KEITH MACOMBER
BY Edward Halle
ATTORNEY.

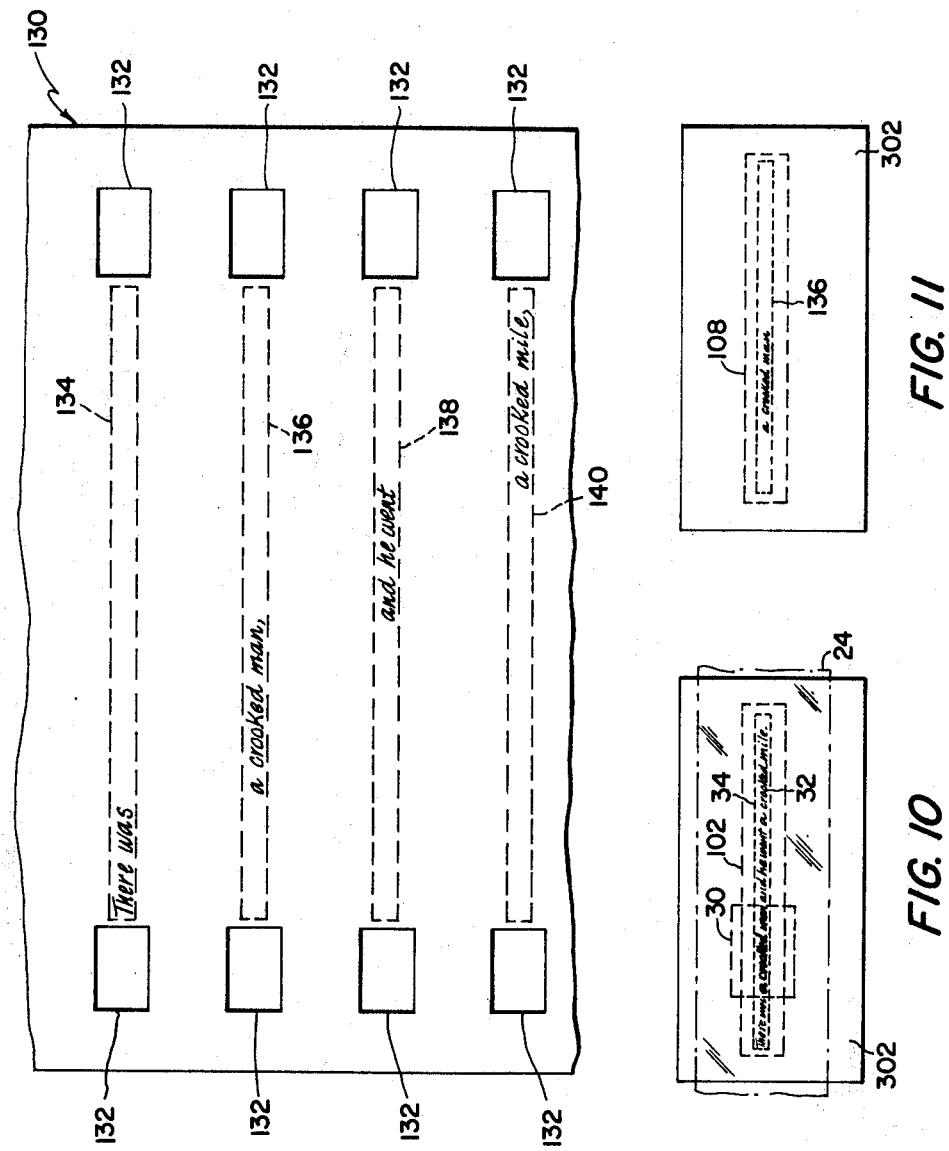

United States Patent Office 3,502,406
Patented Mar. 24, 1970

3,502,406
PROJECTION READER
James Keith Macomber, Rockville Centre, N.Y., assignor to Consolidated Educational Publishing, Inc., a corporation of New York
Filed July 19, 1966, Ser. No. 566,349
Int. Cl. G03b 21/10
U.S. Cl. 353—74
51 Claims

ABSTRACT OF THE DISCLOSURE

A projection reader used to project lines of reading material intermittently. The projection reader has a variable speed main drive mechanism to advance the film at various selected speeds and to traverse a screen mechanism, which has a window (or clear portion), forward along the projected lines of reading material. When the film is moved to its next position the screen mechanism is returned in the opposite direction simultaneously and substantially instantaneously, at speeds independent of the speed of the main drive mechanism. The main drive of the projector may advance the film at a steady adjustable speed past an aperture mask while a traversing screen cooperates to scan successive lines of reading material while the film passes the aperture mask. The projection reader may also project groups of words to be comprehended in eye fixations.

---

This invention relates to readers or reading pacers, and more particularly to such readers comprising a projector for projecting material onto a screen as an aid in teaching or helping a person to improve reading speed.

Essentially, the device comprises an optical system and means to project lines of reading material spaced on a film at various speeds and in various manners.

The purpose of a reading machine is to train a student to read more rapidly and with better comprehension. There are several ways to do this. One way is to have a mechanical means which will guide the eye smoothly at various set speeds along lines of printed material. This is known as scanning. Another method is to divide lines of reading material into word groups which are made to appear successively so that the eye is caused to jump from one group to the next, pausing momentarily in what is called a fixation. It is a well known fact that the human eye normally reads in fixations even though it seems to the reader that his line of sight is traversing each line of reading material smoothly.

The several methods shown in this application are to use first the scanning method to accustom the eye to moving rapidly along the lines of reading material even though by so doing the reader does not achieve complete comprehension. After becoming accustomed to scanning rapidly, the next method employed is to project groups of words successively, each group being small enough to allow the eye to make a fixation, and at the same time comprehend the information conveyed by each individual group of words.

Both of these methods have been used in mechanical and optical devices before, but in each case they have lacked realism to the extent that the student becomes confused to the detriment of learning achievement. For instance, scanning methods heretofore used have had pauses at the beginning and at the end of scanning a line, or have shown one line going slowly out of projection while another one is coming in. Also, previous devices have been too slow in returning from the end of a line to the beginning of the next. This has been a distraction because the human eye is able to move very rapidly from one point to another. Previous fixation methods have also been remiss because they have used windows or other means for presenting equal fractions of lines in displaying word groups which were often meaningless when seen by themselves.

The applicant's device is for training the eye either by the scanning method or the fixation method, or by both. Applicant's device for scanning and for fixations represents significant advances in the art. Applicant's scanning means simultaneously presents the beginning of the next line as it returns from the end of the preceding line. It is also virtually instantaneous in performing these functions regardless of what speed the projection reader is being operated. The same is true in the fixation method. The elapsed time between the disappearance of a word group and the appearance of the next word group is so small as to be indiscernable to the eye. These seemingly instantaneous functions are caused by the release or "triggering" of springs whose speed of operation is independent of the operational set speed of the reader. In one form of the device, applicant's scanning means while scanning a line, shows a bright section, approximately the length of a normal fixation, traversing a line from beginning to end, the rest of the line being subdued, but visible.

This is a very definite improvement over the prior art because a serious fault in reading is regression. Regression is the act of frequently going back a word or two to check what the reader has already read. This fault cannot be corrected immediately, but by making the scanning screen with an open window to attract the eye to the word or group of words that is being read, and by allowing the remainder of the line to be viewed through a transparent or translucent screen which is preferably colored, or lightly etched, the student is allowed to regress but at the same time is trained not to do so by virtue of the fact htat the eye naturally will be led to read the brgihter or clearer image projected through the open window because he can see these words more clearly than the words projected through the colored or etched transparent screen. In referring to screens in the specification and claims, the words "transparent" and "translucent" are used synonymously to indicate a screen which is colored, tinted, etched or otherwise treated to diffuse the light, so as to create a definite distinction between the words projected through the window and the words projected through the screen. The word "film" is used to denote any web, sheet, strip or ribbon of plastic or other material through which light may be passed to project an image.

In the fixation method, applicant's device provides means for presenting groups of words for eye fixations as "sense units" rather than as arbitrary equal fractional lengths of a line of reading material. A sense unit is one word or a group of two or more words such as a phrase, clause or short sentence consisting of a meaningful unit of informtaion which can be normally comprehended in one eye fixation.

The device also has means in conjunction with its aperture to present full lines of reading material successively at various speeds.

An alternate method is portrayed which causes reading material to move steadily past the film plane aperture at a constant set speed. The student can select either of two type of windows in the aperture mask, each embracing two printed lines. One is slanting and preferably traversed by a scanning window in an opaque screen while the other is horizontal and shows complete lines. The first forces the reader to scan without regressing. The second allows the reader to select his own fixations, after becoming accustomed to reading without regressions. Reading with either window has the advantage that the eye drops when leaving the end of a line and starting the next, thereby, in this respect, simulating normal reading.

I accomplish the objects of the invention by providing the device and film as illustrated in the accompanying drawings in which:

FIG. 1 is a medial cross section view;

FIG. 2 is a sectional view taken along the lines 2—2 in FIG. 1;

FIG. 3 is a sectional detail taken along the lines 3—3 in FIG. 2;

FIG. 4 is a detail similar to the center portion of FIG. 2 showing an alternate arrangement;

FIG. 6 is a view of a portion of another piece of film;

FIG. 7 is a view similar to FIG. 2 showing another form of the device of the invention in section taken along the lines 7—7 in FIG. 8;

FIG. 8 is a side view, partly in elevation and partly in section, taken along the lines 8—8 of FIG. 7;

FIG 8a is a front elevation of a detail of the invention;

FIG. 10 is a view of reading material as contained on the film of FIG. 5 projected on a screen;

FIG. 11 is a view of reading material as contained on the film of FIG. 6 projected on a screen;

FIG. 15 is a front elevation view of a detail showing a shutter mechanism; and

FIG. 16 is a sectional view of the shutter mechanism along the lines 16—16 in FIG. 15.

Similar numerals refer to similar parts throughout the several views.

Figure 5:
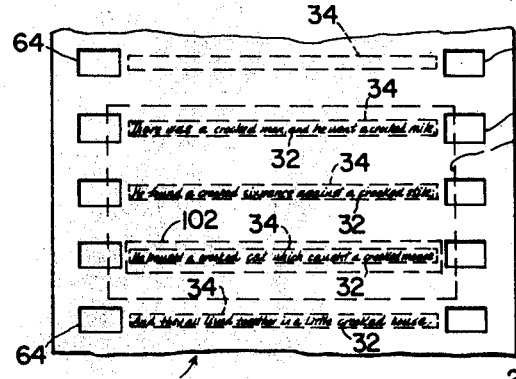
FIG. 5 is a view of a portion of film used in one form of the invention.

Referring now to the form of invention illustrated in FIGS. 1 through 5 of the drawings, there is disclosed a projection reading machine which is an adaptation of a film strip projector. The projector of the invention has the usual projection lamp, condensing lens system and objective lens system common to projecting machines. It also has a drive assembly comprising a motor and a governor. The optical system and the driving motor and governor may be of a conventional type similar to those disclosed in United States Patent No. 2,745,313 granted May 15, 1956, and need not be described or illustrated herein in detail. The motor may be an electric motor, an air motor, a hydraulic motor, a potential energy motor or any other suitable prime mover. It is sufficient to say that drive shaft 20 could be run by a drive mechanism including a governor adapted to be run at selected speeds as illustrated in said United States Patent No. 2,745,313, and that the main body portion or housing 22 of applicant's device and the lens barrel are substantially similar to that disclosed in the mentioned patent. The objective lens barrel would fit on lens barrel adapter 23, as shown in FIG. 1 of the drawings.

Applicant's improvements reside in the film transport mechanism including a potential energy link, the masking means, the traversing screen including a potential energy link, the cam shaft and associated parts.

It is one of the objects of this invention to provide scanning of lines of reading material at various speeds. This is accomplished by providing a traverse screen means 24 adapted to traverse with relation to an aperture 26 in a film plane aperture plate 28, said screen means 24 being provided with an opening, or window, 30.

The material to be projected on a viewing screen is comprised of reading material printed in lines 32 positioned in line spaces 34. The projector is adapted to advance each line space 34, then traverse window 30 across each line space to scan the line, then return screen means 24 and window 30 while advancing the film one line space so that the scanning operation of the next line 32 can be accomplished. The mechanism of the invention provides for almost instantaneous return of the screen means 24 in synchronization with the film advance. The means for accomplishing this are potential energy means, or links, such as springs 72 and 54. Potential energy is stored in potential energy means such as springs 72 and 54 by action of cams 38 and 40 during their camming period while cam shaft 36 is rotating. The potential energy thus stored is converted into kinetic energy when released by cam "drop-offs" on the cams 38 and 40 on cam shaft 36. Cam 40 is a barrel cam and has an end drop off 44. Cam 38 is an edge cam and has an end drop-off 42. A drop-off is considered to be the point where the camming action stops and the cam rider returns or "drops" immediately to the original position it occupied before the camming action started.

Cam 38 is associated with a pawl 46 having a tooth 48 adapted to engage and move ratchet wheel 50 one tooth at a time. Pawl 46 has a cam rider 52 which is spring urged against edge cam 38 by means of spring 54. Ratchet wheel 50 is associated with a detent 56 having sufficient force to maintain ratchet wheel 50 in position unless moved by the operation of pawl 46. When cam shaft 36 revolves, each revolution will press cam rider 52 against action of spring 54 pushing tooth 48 into engaging position with respect to the next succeeding ratchet wheel tooth 58, and when cam rider 52 drops off end drop-off 42, spring 54 will pull tooth 48 back against next tooth 58 to move ratchet wheel 50 a distance of one tooth. This will move sprocket wheels 60 one-sixteenth of a revolution to advance film 62 a distance of one line space 34 within the aperture 26 of the device. Line spaces 34 are located between sprocket holes 64 in the film 62. There are sixteen sprocket teeth 66 on each sprocket wheel 60. Thus, for each revolution of cam shaft 36, ratchet wheel 50 and sprocket wheels 60, being connected together by shaft 70, will revolve one-sixteenth of a revolution equivalent to the distance between two sprocket teeth 66, advancing film 62 by the distance between the centers of two sprocket holes 64, placing the next succeeding line space 34 with a line of reading material 32 in the position of the preceding line 32 which is also moved on.

I have found it preferable in the use of this system to provide an aperture 26 which will include three line spaces 34. Since a line space will advance with each revolution of cam shaft 36 as has been described, it is necessary to place traversing screen means 24 comprising window 30 at a proper starting position with relation to aperture 26 to traverse the line of reading material 32 for scanning purposes while it is at rest between movements of pawl 46. Screen means 24 with its window 30 is returned to its starting position by the potential energy stored in spring 72 which is seated against a washer 39 bearing against a shoulder 41 formed by cam 38 on cam shaft 36, and against a portion of the screen means 24.

In a preferred form of the invention, the screen means 24 comprises a tube 74 slideably mounted on cam shaft 36. Tube 74 has a cam rider 76 which is urged to bear against cam 40 by action of spring 72. The flat portion of the screen means 24, preferably transparent and tinted, is attached to the tube 74 and is urged back against aperture frame 28 by action of spring 72 which transmits to screen means 24 the friction force exerted on washer 39 when cam shaft 36 rotates. In a preferred form of the invention, spring 72 is a helical compression spring, and when its end 80 is seated against the flat portion 24, or the connecting means 82 (as illustrated), it will force the flat portion 24 rearwardly due to the mentioned friction force.

In order to provide a guide as well as a friction reducing element at the point where screen means 24 rides against aperture plate 28, I have provided a plastic bearing 84. As cam shaft 36 revolves, there will be a point during the revolution when cam rider 76, being pressed against action of spring 72 by action of cam 40, will reach the end drop-off point 44 on cam 40, and the spring 72 will provide sufficient force to return cam rider 76 together with the entire screen means 24 back to its starting position to be again pushed by cam 40 to traverse window 30 across aperture 26 until cam rider 76 again reaches the drop-off point 44.

It is a most important feature of the invention to accomplish this quick return of the screen 24 while the film 62 is being advanced one line space 34. I achieve synchronization of these motions by providing cam 38 and cam 40, with drop-offs 42 and 44 respectively, positioned on the cam shaft to be timed to drop cam riders 52 and 76 at substantially the same instant. Since it is impractical to insure, under present manufacturing tolerances, that both drop-offs will be reached at the same instant, I have provided a lost motion coupling means 86 to couple cam shaft 36 to drive shaft 20.

The lost motion coupling means comprises a stub shaft 88 of cam shaft 36 comprising a yoke 90 coacting with a transverse pin 92 in an internal recess 94 on drive shaft 20. The purpose of this construction is to provide lost motion permitting either cam rider 52 or 76, whichever should start to drop first, to cam against its cam end drop-off 42 or 44 as the case may be, and as a result of such camming action, to trigger drop-off action of the other cam rider thereby causing both cam riders to drop at the same time. There should be sufficient clearance in spacing between yoke 90 and pin 92 to provide for an amount of lost motion in the coupling means 86 at least as great as the angular error between the cam drop-offs 42 and 44, due to manufacturing tolerances. Thus, the limits of lost motion in the coupling must be sufficient to provide for simultaneous drop-offs as described.

I also provide cam riders 52 and 76 with rounded cross section to provide curved camming surfaces to cooperate with the lost motion coupling means. Thus, if either cam rider 52 or 76 should start to fall a fraction of a second sooner than the other, its rounded contour will act to cam the cam shaft 36 within the limits of the lost motion of coupling 86 to drop the other cam rider almost immediately so that both cam riders 52 and 76 will be dropping at the same time. This will result in spring 54 acting to move the film a distance of one line space and at the same time spring 72 acting to return screen means 24 and window 30 simultaneously. As a result, the intermittent motion of the film drive will be accomplished by a quick return of the screen means 24 which will then, after return, traverse the next line 32 of reading material while the film 62 is at rest between intermittent motions. In this way, the screen means 24, in addition to its functions as already described, acts somewhat as a shutter during the film advance. Since screen 24 and window 30 will require a full revolution of cam shaft 36 to traverse a line 32 within aperture 26, the speed of traverse scanning can be regulated by adjusting the governor on the drive motor.

Thus, the drive motor drives the cam shaft 36 which in turn, through cams 38 and 40, stores potential energy in springs 54 and 72 respectively. Then the drive motor continues its operation to move the cams around to drop-off points 42 and 44 which trigger the release of the energy stored in springs 54 and 72 to quickly advance the film and return the screen.

Thus, at the end of traverse of screen means 24, the screen means will return at the same time as the film 62 is advanced to the next line space 34. The speed of return of screen means 24 is dependent on the strength of spring 72, and the speed of film advance is dependent on the strength of spring 54. Both speeds are independent of the speed of the drive motor and dependent solely on the strength of the spring means as described. The time required for the return of screen means 24 as well as the time required for the film to advance to the next line will be constant throughout the operation of the device regardless of the speed setting on the drive motor. As a matter of fact, the speeds of screen return and film advance is purposely set to be faster than the speed of changing from one frame to the next in the ordinary motion picture, and thus is not distracting to the normal eye. Thus, because of the camming action described hereinabove, a principal advantage of this feature of the device is that when the device is set to run at extremely low speeds for beginners, the speed of screen return and film advance will nevertheless be at the same fast rate and, therefore, not distracting to the eye.

I have provided a mask means 100 having a horizontal window 102 which masks out all but one line 32 within a line space 34 on the film 62, FIG. 5. By providing for adjustment of the mask 100 in the direction of film travel, I provide an adjustable framing means to align the line of reading material 32. This adjustment means may be necessary for any number of reasons such as lines 32 not being positioned exactly with relation to sprocket holes 64 or the film 62 contracting or expanding by reason of atmospheric conditions, or for any other reason. The adjustment means comprises window 102 having a height in the direction of film travel relatively less than the height of window 30. Thus, window 102 may be moved up and down by moving mask 100 up and down with relation to window 30 to provide adjustment in upper and lower framing limits of the combined masking effect of both windows. Mask 100 may be moved up and down by means of a finger lever 104 pivoted to the frame of the device at a pivot point 106, or by any other adjustment means.

I also provide a second window 108 in mask 100. This second window 108 would be spaced a sufficient distance away from first window 102, in the direction of film travel, so that mask 100 can be moved from a first position with window 102 in alignment with window 30 downwardly to a second position where window 102 is below and out of alignment with window 30, placing window 108 within aperture 26. In such case, if screen 24 has its upper edge 110 at a line which divides the aperture into two portions such as an upper and lower portion, then the portion of aperture 26 covered by screen 24 and by a windowless portion of mask 100 will prevent projection of reading material, and the portion of aperture 26 above screen 24 will permit projection through mask window 108. By providing this adjustment means for moving the mask 100 from a first to a second position, the scanning feature of the device, which includes window 30 and window 102 in alignment with a line of reading material, is blocked out and another of the three lines 32 of reading material at an upper portion of the aperture 26 will be projected without the scanning mechanism. Thus, the projector can be adjusted for projection of a line 32 of reading material with the scanning mechanism, and for projection of a line of reading material 32 without the scanning mechanism. During projection without the scanning mechanism, the scanning mechanism will continue to operate. However, it will be blocked off by the masking means of the device. The projection through window 108 will be of a line of reading material 32 relatively higher within the aperture and will consist of intermittent advances of the next succeeding lines 32, flashing such succeeding lines of reading material on the viewing screen 302 without scanning. These two different results obtained from the machine may be used during an educational process or method which may require a certain period of scanning at different speeds, and then some learning periods in which the line are presented to the student without scanning.

It is, of course, understood that when the terms "upper" and "lower" or the terms "right" and "left" are used with reference to the projector, there would be a reversal of image on the viewing screen 302 so that what would be "upper" in the aperture of the projector would be termed "lower" on the viewing screen 302, and what would be on the left side in the aperture of the projector would be on the right side of the image flashed on the viewing screen 302.

In FIG. 5 of the drawings, I show a form of film 62. The printing on the film 62 in FIG. 5 is shown in upright position. It is to be understood, however, that when the film 62 is placed in the projector, the reading material is positioned on the film so that it is upside down and reversed from left to right so that it will appear upright and in proper left to right relationship when projected on a screen such as screen 302 as shown in FIG. 10 of the drawings so that the reading material can be read properly.

The film 62 is supported in projection position by means of film guides 112 and 114 in cooperation with sprocket teeth 66 of sprocket wheels 60. In the form of invention as shown, the film is short enough to be held by the film guides 112 and 114 and the sprocket wheels 60. The film will coil and uncoil automatically as shown at reference numerals 118 and 120. However, if it is desired, the film may be stored on reels both for supply and take-up purposes. This manner of running film through a projector on reels is well known to the art and need not be further described or illustrated.

In FIG. 4 if the drawings, I have shown an alternate form of mask in which the single window may be moved within aperture 26 from a lower to an upper position to produce the same result as the double window construction just described. In the alternate form, the mask 100a is adapted to move in the direction of double headed arrow, the direction of film travel. The window 122 is centrally located on the mask 100a. When the mask is moved downwardly, the window takes the position of the lower solid line portion in FIG. 4 which would correspond to being in alignment with window 30, and when mask 100a is moved upwardly, window 122 takes the position of the upper dotted line window in FIG. 4 in aperture 26 which corresponds to the position of window 108 when mask 100 would be in second position.

Reference tto FIG. 10 of the drawings will show a viewing screen 302 on which a line of reading material taken from film 62 of FIG. 5 is projected. The dotted line 24 represents an imaginary projection of the traversing screen 24, for purposes of illustrating its function. The dotted line 102 represents the projection of the mask window 102, and the dotted line 30 represents the projection of traversing screen window 30. Dotted line 34 represents the projection of a line space of the film 62, and reference numeral 32 represents the projection of a line of reading material on the film. It is to be understood that during the time line 32 is held stationary for projection, in the intermittent cycle of the drive mechanism of the projector, window 30 as contained in traversing screen 24 will scan the projected line from left to right as shown in FIG. 10 of the drawings.

If traversing screen 24 is transparent, or transparent and tinted or colored, with a clear open window 30, the reading material projected through window 30 being unaffected by the filtering or diffusing action of the transparent screen 24, will be bright and bold. The balance of the line 32 will be subdued thereby inhibiting regression on the part of the student or reader. The traversing screen 24 may also be made opaque so that only that part of the line 32 appearing through window 30 will be visible during scanning across the screen 302 thereby preventing regression.

Another feature of this invention is the provision of a film to be used in the projector which provides for scanning lines of reading material by "sense units" of the information conveyed by the reading material. As was stated hereinabove, a sense unit is one word or a group of two or more words such as a phrase, clause or short sentence consisting of a meaningful unit of information which can be normally comprehended in one eye fixation. It is contemplated that a sense unit would ordinarily be either one word or the smallest combination of words necessary to form a thought, generally a number of words necessary to form a thought, generally a number of words less than a full line of the text.

In order to present the text of reading material containing the information to be transmitted to the student during the reading course in units of information such as sense units, it is necessary to provide equipment capable of projecting a word or word group, standing alone, in a position corresponding to the position which said word or word group would have occupied in the normal line of printed text. I have, therefore, devised a film to be projected through a window such as window 108 for reading lines of text broken up into sense units. The film is prepared with each succeeding line space of the film having substantially one sense unit. The following paragraph is used as a standard text to illustrate and explain the use and advantages of sense units.

"There was a crooked man, and he went a crooked mile,
He found a crooked sixpence against a crooked stile;
He brought a crooked cat, which caught a crooked mouse,
And they all lived together in a little crooked house."

A film printed with the foregoing paragraph of text could contain a line of the text on each line space of the film, and could be projected by the reader either through use of the device with scanning window 30 or as full lines through the use of the device with window 108.

The same paragraph can be broken up into line fractions of equal length for reading by fixations, as follows:

"There was a c
    rooked man, a
        nd he went a
            crooked mile,
He found a cr
    ooked sixpenc
        e against a c
            rooked stile;
He bought a c
    rooked cat, w
        hich caught a
            crooked mouse,
And they all
    lived togethe
        r in a little
            crooked house."

While the division of the material into equal fractional line lengths is a means of shortening the lines into units of a good size for fixation purposes, this mechanical chopping into exact fractional units leaves us with reading material which in most part is little better than nonsense, and is undesirable.

The same paragraph is now set forth with the lines broken up into sense units in accordance with the invention, each sense unit in its proper relative position transversely on its line position as it would have had if in proper position in the full line of the standard text as first shown above:

'There was
    a crooked man,
        and he went
            a crooked mile,
He found
    a crooked sixpence
        against
            a crooked stile;
He bought
    a crooked cat,
        which caught
            a crooked mouse,
And they all
    lived together
        in a little
            crooked house."

Referring now to FIG. 6 of the drawings, we find a film 130 having sprocket holes 132 and line spaces 134, 136, 138 and 140. The first sense unit "There was" is set forth on line 134. The next sense unit "a crooked man," is set forth on line space 136. The next sense unit "and he went" is set forth on a line space 138, and the last sense unit of the first line "a crooked mile," is set forth on line space 140.

Film 130 is shown right side up in FIG. 6 of the drawings. It is to be understood that film 130, in the same manner as film 62, shown in FIG. 5, is placed in the projector with the reading material upside down and reversed from left to right so that the sense units will appear upright and in proper left to right relationship when projected on screen 302, as shown in FIG. 11 of the drawings.

The remaining sense units of the text are treated similarly and need not be illustrated further.

When a film such as film 130, in FIG. 6, is displayed through a window such as window 108 and the projector is put into operation, each succeeding line will flash a sense unit, and the prepared standard text can then be shown to a student in successive fixations consisting in general of meaningful units of information. This is illustrated in FIG. 11 of the drawings in which dotted line 108 represents the masking effect on screen 302 of mask window 108, and dotted line 136 represents line space 136 of film 130 containing the sense unit "a crooked man" being projected as one of a series of sense unit fixations. After the sense unit fixations are run through at various speeds as desired, it may then be desirable to run through a series of complete lines of text in accordance with the standard format from which the sense units were taken. This is done by providing a film such as film 62, in FIG. 5, in which the complete lines 32 of the standard text are portrayed in the line spaces 34. The film 62 is run through window 108 without any auxiliary scanning apparatus to show the full lines in succession, each line containing all of the sense units previously shown separately.

I also provide another form of the invention as shown in FIGS. 7 to 8a of the drawings. This second form of invention is substantially similar to that shown in FIGS. 1 to 3, the essential difference being in the masking mechanism used in association with the traversing scanning mechanism, and also in the film transport which has a mechanism for steady continuous movement rather than for an intermittent movement.

Figure 9:
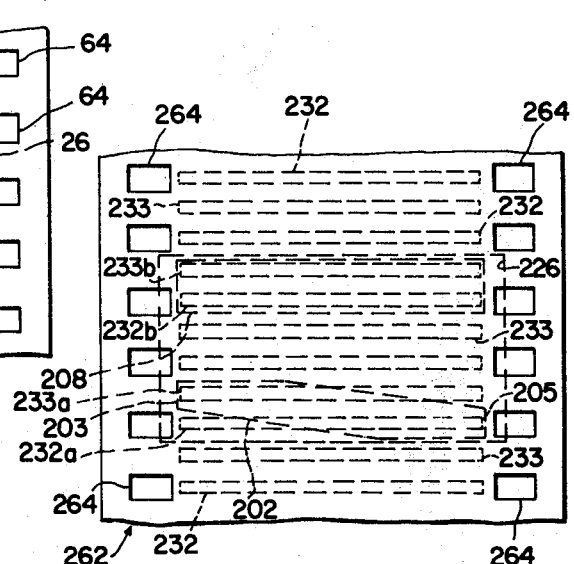
FIG. 9 is a view of a portion of a third piece of film used in the invention.

The construction of the second form of the invention provides for a presentation of successive lines of the prepared text for either scanning or complete line viewing. In this second form of invention, the film is transported through film guides 212 and 214, being moved by sprocket wheels 260 having teeth 266. The mechanism of the device is driven by a main drive motor similar to that in the first form of the invention. The drive shaft 220 is connected to cam shaft 236 which has a cam such as barrel cam 240 acting in association with a cam rider 276 mounted on tube 274 of screen means 224 having screen window 230. Screen means 224 traverses in exactly the same manner in this form of the invention as screen means 24 did in the first form of the invention. Inasmuch as it is desirable in this form of invention to view more than one line of material for purposes of continuity, I prefer to have masking windows in the masking means 300 which are tall enough or high enough in the direction of the movement of the film to show at least two lines of reading material at one time. In the first form of invention, the film such as film 62 would normally have three pairs of sprocket holes 64 within the height of the aperture 26 at one time. In the second form of invention, it is desirable to place more lines within the aperture height so that the windows of the mask means 300 can accommodate more lines without crowding the disposition of the windows within the aperture. Thus, film 262, in FIG. 9, has one line space 232 lined up with and between each pair of sprocket holes 264 as well as an additional line space 233 between each line space 232, thus providing a total of at least six line spaces either 232 or 233 within aperture 226 at any given time. Mask 300 is provided with an upper window 208 and a lower window 202. Lower window 202 forms a slanted transverse opening with a first end 203 in substantial alignment with an end of one line space such as line space 233a, and with a second end 205 in substantial alignment with the end of an adjacent line space 232a. Thus, when the device is set up with mask means 300 in a first position having transverse slanted window 202 in the position as designated in FIG. 9 over line spaces 233a and 232a, portions of each of the mentioned line spaces will appear through the slanted mask window 202 simultaneously. It is to be understood that FIG. 9 is seen from a position in front of the projector looking toward the rear.

Figure 12:
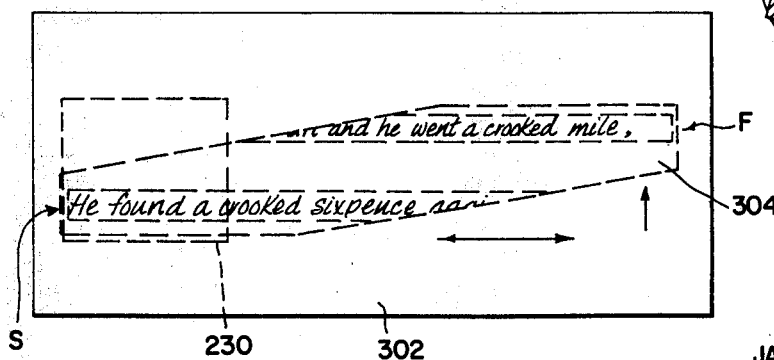
FIG. 12 is a view similar to FIG. 10 showing reading material as projected through the form of invention as projected through the slanted transverse opening of the form of invention shown in FIGS. 7 and 8 of the drawings.

Assuming now that the motor of the device is driving the film continuously, then lines of material will appear successively through the slanted mask window 202 opening to project them on the viewing screen 302 in a similar manner. Since the film moves downwardly to be projected through aperture 226 and slanted mask window 202, the lines 232 and 233 will appear to be moving upwardly on the viewing screen 302 within the projected slanted mask area 304. This is shown in FIG. 12 of the drawings. The viewing screen is represented by reference numeral 302, the projection area through the mask is represented by reference numeral 304, and the direction of movement of the lines is represented by the arrow. It will be understood that as these lines move upwardly on the viewing screen 302, normal reading starting at the left end of the line and ending at the right end, the speed of movement may be adjusted to accommodate the speed of the student reading the lines so that he has sufficient time to start reading a line at point designated by letter S and finish reading that line at point designated by letter F at which time his eyes would then drop and return to starting point S to read the next line. This arrangement permits the reader to normally drop his eyes at the end of each line as he would do if reading printed lines in a newspaper, book or other printed publication.

In order to teach faster reading habits, the speed of the film is increased so that the projected words on the viewing screen 302 will disappear at the point of letter F unless the reader speeds up his reading pace before he gets there. Thus, by increasing the speed the student is forced to read faster in order to keep up with the presentation of the reading material.

The traversing screen means 224 with its window 230 is interposed in alignment with the slanted window 202. The scanning window 230 is represented on viewing screen 302 by dotted line, marked reference numeral 230, and moves in the direction of double headed arrow as shown in FIG. 12 of the drawings. Thus, as the student follows the reading material, he would start when the representation of the mask of the scanning window 230 was on the left hand side of the viewing screen 302 and follow the movement of scan as scanning window 230 traverses to the right hand side of the viewing screen, moving his eyes upwardly and to the right from starting point S to finish point F at which point the scanning window 230 would be returned instantaneously with its screen means 224 to starting position by the mechanism of the device described hereinabove. Traversing screen means 224 may be either transparent, and colored or tinted, or it may be opaque. The applicant prefers to make it opaque in this form of the invention to prevent regressions.

It is necessary to synchronize the movement of the film with the traverse of the scanning mechanism screen 224 so that there will be one complete traverse across and back for each advance of one line of space of the film. There are normally sixteen sprocket teeth 266 on sprocket wheels 266. Thus, since there are two lines of material for each pair of sprocket holes, one complete revolution of sprocket wheel 260 on its shaft 270 will move 32 lines of material. It is, therefore, necessary to have a 32 to 1 ratio between the revolutions of cam shaft 236 and sprocket shaft 270 to achieve 32 complete traverse cycles for each movement of 32 lines of material.

Figure 13:
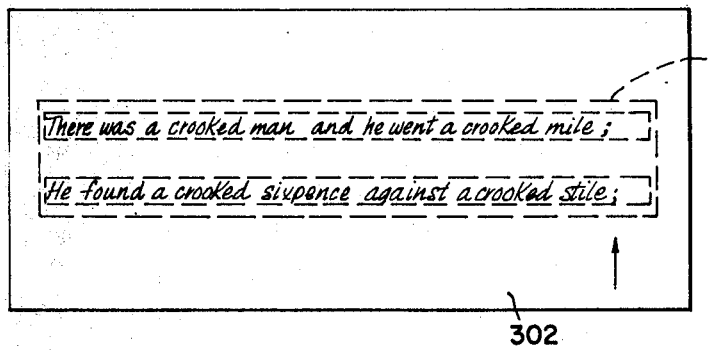
FIG. 13 is a view similar to FIG. 12 showing reading material as projected through the horizontal window of the form of invention shown in FIGS. 7 and 8 of the drawings.

I have, therefore, provided a reduction gear system 271 taken off drive shaft 220 comprising bevel gear 241, bevel gear 242, worm 244 and worm gear 246 which in turn drives shaft 270 one thirty-second of a revolution for each revolution of shaft 220 and cam shaft 236. The entire reduction gear assembly 271 may be rotated outwardly by means of lever 248 to disengage the mechanism for purposes of advancing the film manually by rotating shaft 270 with knob 310. The reduction gear assembly 271 is kept in place by action of spring 250 which pulls lever 248 toward worm gear 246. Mask means 300 is also adjustable in the direction of film travel for framing purposes and for the purpose of lowering window 202 and window 208 to change the projection area of the aperture 226 from its lower portion below the screen edge 210 to its upper portion above screen edge 210. Thus, by lowering mask means 300, window 202 is lowered below the aperture 226 causing mask 300 to mask the lower part of aperture 226, and window 208 is lowered from above the aperture 226 into the upper part of aperture 226 to be positioned to permit projection of line spaces 233b and 232b of film 262. This area is represented by dotted line, reference numeral 208 in FIG. 9 of the drawings. When the mask means 300 is in this second or lower position, there will be a continuous projection of a height of reading material equivalent to at least two full lines, through the horizontal window 208 as represented in FIG. 13 of the drawings. These lines will travel upwardly in the direction of the arrow on the viewing screen 302 to simulate an upwardly moving column of printed material of which at least two or more lines may be seen at one time to permit continuous reading of the material without mechanical scanning means.

It is to be understood in viewing FIG. 9 that the dotted line representations of window 202 and of window 208 are not in their usual relative positions on mask means 300 since both windows may not normally be within aperture 226 at the same time. Either one or the other is above or below the aperture 226 as the case may be. However, for purposes of illustration only, in FIG. 9 the dotted line representations of both windows are within the dotted line representation of aperture 226, with relation to a section of film 262, to show the position of each of the windows when it is within the aperture 226.

The teacher may wish to allow the student limited regression by permitting him to read the lines of printed material as they move up through space 304 on viewing screen 302 without using the scanning screen 224. If so, the objective lens barrel adapter 23 may be removed, permitting the operator to reach in and rotate the screen 224 ninety degrees forward, to latch it onto the latch arm 227. The screen will then be outside the light beam and the image projected on the screen will be like FIG. 12 with dotted line 230 removed showing everything within the space 304 without the scanning effect of traversing screen 224.

Latch arm 227 is hinged on bracket 225 by means of pintle pin 229. Screen 224 has a notch 233 adapted to receive latch arm 227 which has a headed portion 235. Latch arm 227 also is connected to bracket 225 by means of a spring 231 which acts to maintain latch arm 227 in an upright position. Thus, when screen 224 is rotated forward, headed portion 235 will maintain it in its forward position. By pulling headed portion 235 of latch arm 227 forward, the operator releases screen 224, allowing fraction force from cam shaft 236 to return to its normal scanning position. FIG. 8a shows a front elevation of the latch mechanism.

In FIG. 13 of the drawings, there is a representation of a viewing screen 302 with two lines of reading material projected on it through upper mask window 208, the dotted lines 208 on FIG. 13 representing the masking effect of mask window 208. There is no scanning mechanism interposed when mask window 208 is in position.

To review, an important function of the scanner is to train the student to read without regressing. Since, in this form of the invention (FIGS. 7 to 8a), the film is moving continuously at some set speed, the student is limited to regressing one line if using the two line window as illustrated in FIG. 13. He is limited to regressing a fraction of a line using the slanted window 202 if the scanner 230 is rotated out of position. (FIG. 12 without dotted line 230.) When in scanning position, the scanner, being opaque, allows substantially no regression.

Figure 14:
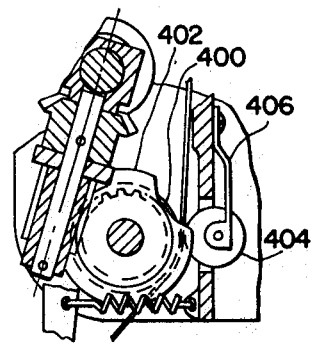
FIG. 14 is a view similar to FIG. 3 showing an alternate form of film advance.

There may be a limited demand for a projector in the form shown in FIGS. 7 to 8a without a mechanical scanner at all since it would be less expensive. Without a scanner, the projector does not necessarily require a sprocket since the film motion is continuous, there are no intermittent motions, and therefore no need for a fixed relationship between the window and sprocket teeth. To advance the film without a sprocket, I might provide an advance roll with an idler to provide friction, as shown in FIG. 14, or I might provide an advance roll and mechanism to reel up the film similar to the advance roll 100 shown in applicant's co-pending application Ser. No. 331,573, now Patent No. 3,302,309.

The mechanism shown in FIG. 14 is substantially similar to the mechanism illustrated in FIGS. 7 and 8 of the drawings except that sprocket wheels 266 have been replaced with a smooth roller 400 having flanges 402 at each end. Cooperating with smooth roller 400 would be a spring mounted idler roller 404 pressed toward smooth roller 400 by means of spring 406. Idler roller 404 would be located to bear against roller 400 approximately midway between the flanges 402. When a film is inserted between the rollers, driving friction is provided between the film and the smooth roller 400.

The scanning mechanism of the first form of the invention which comprises test tube 47 and cam shaft 36 is provided with a felt bumper 37, as illustrated in FIG. 2 of the drawings, to absorb the shock when the tube 74 hits felt bumper 37 at the end of each return movement. The second form of invention is provided with a dash pot 237 as illustrated in FIG. 7 of the drawings for the same purpose. It is to be understood that any type of shock absorbing stop means may be used in either form of the invention, and that either the felt bumper or the dash pot are interchangeable in either form of the invention.

I may provide an alternate form of transverse screen means similar to screen 24 and screen 224 containing shutter means to momentarily cover the window such as window 30 or window 230 as the case may be during the return movement of its screen. Referring to FIGS. 15 and 16 such shutter means could be in the form of a small flat plate 410 slideably mounted between guides 412 and would be opague together with a screen 424 on which it was mounted. Each guide 412 would have end stops 414 at the ends thereof in order to prevent shutter 410 from leaving the guides during its operation.

Shutter 410 is made preferably of opaque low friction plastic and is fitted loosely in guides 412 so that it will slide easily from a position to the left of window 430 as shown in FIG. 15 of the drawings to a position covering window 430, and conversely from a position covering window 430 to a position to the left of window 430. Movement of the shutter and its operation are accomplished as follows:

Screen 424, in a manner similar to the operation of screen 24, is moved to its right as shown in FIG. 15 of the drawings until a cam rider reaches a drop-off point releasing potential energy in a spring as described hereinabove to move screen 424 to the left with a high rate of acceleration. The friction between shutter 410 and its guides 412 being insufficient to accelerate the shutter at the same rate, the shutter 410 lags behind and covers the window 430 during return of the screen 424. When screen 424 reaches its limit of return by either striking buffer 37 or the dash pot 237, the high rate of deceleration causes the shutter 410 to move to the left due to its inertia. This uncovers window 430 and leaves the window uncovered during the scanning part of the cycle while the screen 424 is moving to the right. The shutter closes again in the same manner each time that the screen 424 is moved to the left under high acceleration. Shutter 410 would be useful to its maximum extent only when it and its screen 424 are both opaque.

In both forms of the invention, forms of film advance including either sprocket wheels 60 or sprocket wheels 260 have been mentioned. It is to be understood that there are other types of film advance mechanisms well known in the art such as a toothed "claw," and it is intended that the term "sprocket means" as used herein and as used in the claims hereinbelow shall define any type of toothed means suitable for advancing film in a projector.

While I have described my invention in its preferred forms, there are other forms which it may take without departing from the spirit and scope of the invention, and I, therefore, desire to be protected for all forms coming within the scope of the claims hereinbelow.

Wherefore I claim:

1. A projection reader having a main frame, including a light source and a projection lens system, comprising: an aperture plate including an aperture, means for supporting in projection position film comprising a plurality of lines of reading material to be projected, sprocket means for advancing said film intermittently with said lines being successively positioned in projection position and held stationary during projection, drive means, controlled by speed governor means, operatively connected to said sprocket means for advancing said film, a first cam and second cam, said cams being connected to said drive means by lost motion coupling means, said first cam including a drop-off and said second cam including a drop-off; screen means adjacent said aperture comprising a window relatively smaller than said aperture, and ratchet means connected to said sprocket means associated with pawl means, said pawl means having a cam rider urged by spring means to bear against said first cam; said screen means being reciprocally mounted with relation to said aperture and having a cam rider urged by spring means to bear against said second cam, said drop-off of said first cam and said drop-off of said second cam being relatively positioned within the limits of lost motion of said lost motion coupling means to synchronize drops of said pawl means cam rider and said screen means cam rider.

2. The projection reader as defined in claim 1, in which the first cam is an edge cam and the second cam is a barrel cam.

3. The projection reader as defined in claim 2, in which the first mentioned cam rider and the second mentioned cam rider each have at least one curved contour portion.

4. The projection reader as defined in claim 1, in which said screen means comprises a tube-like portion and a substantially flat portion in which said tube-like portion is adapted to slide fit over said cam shaft and comprises the second mentioned cam rider, and in which said flat portion comprises said window.

5. The projection reader as defined in claim 1, in which said screen means comprises a tube-like portion and a substantially flat portion in which said tube-like portion is adapted to slide fit over said cam shaft and comprises the second mentioned cam rider, and in which at least a portion of said flat portion is transparent, said flat portion comprising said window.

6. The projection reader as defined in claim 4, in which said second mentioned cam rider is spring urged to bear against said second cam by means of a helical spring positioned around the tube-like portion of the screen means.

7. The projection reader as defined in claim 44, which also comprises mask means, positioned adjacent said aperture, comprising at least one window in substantial alignment with at least one line of said reading material, when held stationary during projection, and with the clear portion of said screen.

8. The projection reader as defined in claim 7, in which the mask window is adjustable in the direction of film travel.

9. The projection reader as defined in claim 8, in which the clear portion of the screen has greater length in the direction of film travel than the mask window.

10. The projection reader as defined in claim 8, in which the aperture comprises first and second portions, with said screen means screening the first portion only, and in which said mask window is adjustable in the direction of film travel to be positioned either in a first position in substantial alignment with the clear portion of said screen in the first portion of the aperture or in a second position within the second portion of said aperture, unscreened by said screen means and in substantial alignment with a line of reading material.

11. The projection reader as defined in claim 4, in which the aperture comprises upper and lower portions, and in which mask means comprising a lower window and an upper window are included, said mask being adjustable in the direction of film travel and having a dimension in the direction of film travel relatively greater than the dimension of the aperture in the direction of film travel, said lower window and said upper window being a distance apart in the direction of film travel so that when said mask means is moved to a first position with said lower window in substantial alignment with said clear portion of the screen, said upper window will be above said aperture, and when said mask is moved to a second position with said lower window below said clear portion of the screen, said upper window will be aligned with a portion of the upper portion of the aperture.

12. A projection reader having a main frame, including a light source and a projection lens system comprising: an aperture, means for supporting in projection position film comprising a plurality of lines of reading material to be projected, said aperture being adapted to permit the projection of at least one line of reading material, variable speed drive means controlled by speed governor means, and film advance means connected to said drive means to advance said film intermittently with at least one of said lines being positioned in projection position including potential energy means adapted to advance said film in a substantially constant time, independent of the speed of the variable speed drive means, by discharge of the potential energy stored therein.

13. The projection reader as defined in claim 12, in which said potential energy means comprises at least one spring.

14. The projection reader as defined in claim 12, which also comprises means connected to drive means to load said potential energy means with potential energy.

15. The projection reader as defined in claim 14 which also comprises means connected to said drive means to release the potential energy of said potential energy means.

16. A projection reader, for successively projecting lines of reading material contained on a film, including variable speed drive means, film advance means for advancing said film, scanning means comprising screen means including a clear portion adapted to scan said lines by guiding the eye along at least one line during projection, said scanning means comprising: cam means driven by said variable speed drive means to move said scanning means along at least one line of reading material during the scanning motion, and potential energy means adapted to return said scanning means in a substantially constant time, independent of the speed of the variable speed drive means, by discharge of potential energy stored therein.

17. The projection reader as defined in claim 16 in which said potential energy means comprises at least one spring.

18. The projection reader as defined in claim 16 which also comprises means connected to drive means to load said potential energy means with potential energy.

19. The projection reader as defined in claim 18 which also comprises means connected to said drive means to release the potential energy of said potential energy means.

20. A projection reader for intermittently projecting successive lines comprising reading material contained on a film comprising: film advance means and variable speed drive means for advancing said film comprising potential energy means between said drive means and said film advance means, said potential energy means comprising at least one spring, means connected to said drive means to load said potential energy means with potential energy, means connected to said drive means to release the potential energy of said potential energy means, scanning means comprising screen means including a clear portion adapted to scan each line transversely during projection comprising a second potential energy means including at least one spring between said drive means and said scanning means, together with means connected to said drive means to load said second mentioned potential energy means; and means connected to said drive means to release said second mentioned potential energy means; said drive means also comprising lost motion means to synchronize the operation of said first and second potential energy release means.

21. A projection reader including a light source and a projection lens system comprising: an aperture, means for supporting in projection position a film having a plurality of line spaces comprising reading material to be projected, means for advancing said film, controlled by speed governor means, and an aperture mask comprising a slanted transverse opening with a first end in substantial alignment with an end of one of said line spaces when a second end of said transverse opening is in substantial alignment with an end of another of said line spaces adjacent to said first mentioned line space.

22. The projection reader as defined in claim 21 further comprising screen means comprising an opening adapted to traverse said mask opening in said aperture mask together with screen drive means connected to said main drive, said screen opening being relatively narrower than the transverse opening in said mask, said drive means being adapted to drive said film advance means and said screen in synchronism so that said screen opening will traverse for each advance of one line space of said film.

23. The projection reader as defined in claim 22 in which the said screen means is adapted to be positioned selectively in a first position in projection alignment with at least a portion of said aperture and selectively to a second position not in projection alignment with said aperture.

24. The projection reader as defined in claim 21 in which said aperture comprises a first portion and a second portion, and in which said aperture mask is adjustable in the direction of film travel and has a dimension in the direction of film travel relatively greater than the dimension of the aperture in the direction of film travel, and in which said aperture mask comprises a second opening displaced in the direction of film travel from said first mentioned slanted transverse opening so that when said aperture mask is moved to a first position with said first mentioned opening in substantial alignment with said screen opening within a first portion of the aperture, said second mentioned opening will be outside of said aperture, and when said aperture mask is moved to a second position with said first mentioned opening out of alignment with said screen opening, said second mentioned opening will be within the aperture and in alignment with and embracing at least two line spaces within said second portion of said aperture.

25. A projection reader including a light source and a projection lens system comprising: an aperture, means for supporting in projection position a film comprising a plurality of lines of reading material to be projected, means for advancing said film, a main drive and drive means controlled by speed governor means operatively connected to said film advance means, a cam shaft comprising a cam, being connected to said drive means, an aperture mask having a slanted transverse opening with a first end in substantial alignment with one of said lines, and a second end in substantial alignment with another of said lines adjacent to said first mentioned line, screen means reciprocally mounted with relation to said cam and being spring urged toward said cam and having a cam rider bearing against said cam, said screen means having an opening relatively narrower than the transverse opening in said mask, said opening in said screen being positioned in relative alignment to said first and second mentioned lines; said film advance means and said cam shaft being adapted to be actuated in a timing relationship which will provide for one traverse and return movement of the screen for each advance of one line of the film.

26. The projection reader as defined in claim 25, in which said cam is a barrel cam.

27. The projection reader as defined in claim 26, in which the cam rider has at least one curved contour portion.

28. The projection reader as defined in claim 25, in which said screen means comprises a tube-like portion and a substantially flat portion in which said tube-like portion is adapted to slide fit over said cam shaft and comprises the cam rider, and in which said flat portion comprises said screen opening.

29. The projection reader as defined in claim 28, in which said cam rider is spring urged to bear against said cam by means of a helical spring positioned around the tube-like portion of the screen means, said helical spring acting against said cam shaft and said screen means.

30. The projection reader as defined in claim 25, in which the mask is adjustable in the direction of film travel.

31. The projection reader as defined in claim 30, in which the screen opening has a relatively greater length in the direction of film travel than the upper and lower limits of the mask opening.

32. The projection reader as defined in claim 31, in which said aperture comprises a first portion and a second portion, and in which the mask means is adjustable in the direction of film travel and has a dimension in the direction of film travel relatively greater than the dimension of the aperture in the direction of film travel, and said mask means comprises a second opening displaced in the direction of film travel from said first mentioned slanted transverse opening so that when said mask means is moved to a first position with said first mentioned opening in substantial alignment with said screen opening within a first portion of the aperture, said second mentioned opening will be outside of said aperture, and when said mask means is moved to a second position with said first mentioned opening out of alignment with said screen opening, said second mentioned opening will be within the aperture and in alignment with and embracing at least two line spaces within the second portion of said aperture.

33. The projection reader as defined in claim 1, in which the said first and second cams are both positioned on a cam shaft connected to said drive means by said lost motion coupling means.

34. A projection reader having a main frame, including a light source and a projection lens system comprising: an aperture, means for supporting in projection position film comprising a plurality of lines of reading material to be projected, said aperture being adapted to permit the projection of at least one line of reading material, variable speed drive means controlled by speed governor means, film advance means connected to said drive means to advance said film intermittently with at least one of said lines being positioned in projection position; screen means mounted adjacent said aperture comprising a clear portion relatively shorter than said aperture in the scanning direction, and means to reciprocate said screen means alternately in scanning and return directions including cam means to move said clear portion along at least one of said lines in the scanning direction.

35. A projection reader, for projecting successive lines comprising reading material as contained on a film, including scanning means comprising screen means including a clear portion adapted to scan said lines during projection, comprising: means to move said scanning means and drive means for advancing said film, comprising potential energy means between said drive means and said scanning means, including an aperture mask having a slanted transverse light transmitting area with a first end in substantial alignment with an end of one of said lines when a second end is in substantial alignment with an end of another of said lines adjacent to said first mentioned line, and in which said clear portion in said screen means is positioned in substantial alignment with portions of said first and second mentioned lines.

36. The projection reader as defined in claim 35, in which the mask is adjustable in the direction of film travel.

37. The projection reader as defined in claim 36, in which the clear portion of the screen means has a relatively greater length in the direction of film travel than the upper and lower limits of the mask opening.

38. The projection reader as defined in claim 37, in which the said aperture mask and the said screen means are associated with an aperture and in which said aperture comprises a first portion and a second portion, and in which the mask means is adjustable in the direction of film travel and has a dimension in the direction of film travel relatively greater than the dimension of the aperture in the direction of film travel, and said mask means comprises a second opening displaced in the direction of film travel from said first mentioned slanted transverse opening so that when said mask means is moved to a first position with said first mentioned opening in substantial alignment with said clear portion of the screen means within a first portion of the aperture, said second mentioned opening will be outside of said aperture, and when said mask means is moved to a second position with said first mentioned opening out of alignment with said clear portion of the screen means, said second mentioned opening will be within the aperture and in alignment with and embracing at least two line spaces within the second portion of said aperture.

39. A projection reader, for projecting successive lines comprising reading material as contained on a film, including scanning means comprising screen means including a clear portion adapted to scan said lines during projection, comprising: means to move said scanning means and drive means for advancing said film, comprising potential energy means between said drive means and said scanning means, in which the screen means including the clear portion comprises shutter means being adapted to move, relative to said clear portion, between a position covering said clear portion and a position clear of said clear portion.

40. The projection reader as defined in claim 39 in which said shutter means is slideably mounted on guide means.

41. The projection reader as defined in claim 40, in which the shutter means is inertially controlled.

42. The projection reader as defined in claim 41, in which said guide means are in spaced parallel relationship having end stop means at each end thereof, with said clear portion positioned between said guide means, with an edge of said clear portion relatively near a first of said end stop means at one end of said guide means, with a second of said end stop means relatively far from an opposite edge of said clear portion and in which said shutter means comprises a slideable plate of a size to cover said clear portion when within said guide means at said clear portion end.

43. The projection reader as defined in claim 42 in which the screen means including its clear portion is first moved from a starting position by said drive means along a line substantially parallel to a line of reading material and is then returned by said potential energy means to said starting position, said shutter plate being clear of said screen means clear portion during its first movement; and when energy stored in said potential energy means is released to accelerate and move said screen means in its return direction, said shutter plate is caused by its inertia to move relative to said clear portion to a position to cover said clear portion; and then at the end of the return of the screen means, said shutter plate is caused by its inertia to continue to move until stopped by the second mentioned end stop means, uncovering said clear portion.

44. A projection reader having a main frame, including a light source and a projection lens system, comprising: an aperture, means for supporting in projection position film comprising a plurality of lines of reading material to be projected, toothed means for advancing said film intermittently with at least one of said lines being positioned in projection position and held stationary during projection; drive means, controlled by speed governor means, operatively connected to said toothed means for advancing said film; a first cam and a second cam, said cams being connected to said drive means by lost motion means, said first cam including a quick return means and said second cam including a quick return means; screen means adjacent said aperture comprising a clear portion, and ratchet means connected to said toothed means associated with pawl means, said pawl means having a cam rider bearing against said first cam; said screen means being reciprocally mounted with relation to said aperture and having a cam rider bearing against said second cam, said quick return means of said first cam and said quick return means of said second cam being relatively timed to operate within the limits of lost motion of said lost motion means, whereby the quick return of one of said cam riders initiates the quick return of the other of said cam riders.

45. The projection reader as defined in claim 8, in which the clear portion of the screen is shorter in the direction of screen motion than the mask window.

46. A projection reader having a main frame, including a light source and a projection lens system comprising: an aperture, means for supporting in projection position film comprising a plurality of lines of reading material to be projected, said aperture being adapted to permit the projection of at least one line of reading material, variable speed drive means controlled by speed governor means, film advance means connected to said drive means to advance said film intermittently with at least one of said lines being positioned in projection position; screen means mounted adjacent said aperture comprising a clear portion relatively shorter than said aperture in the scanning direction, and means to reciprocate said screen means alternately in scanning and return directions including potential energy means to move said clear portion in the return direction.

47. The projection reader as defined in claim 46, in which said film advance means includes a cam and said means to reciprocate said screen means includes a cam, and in which said cams are connected to said drive means through lost motion means to synchronize the action of said film advance means and the return action of the said means to reciprocate the screen means.

48. The projection reader as defined in claim 34 which further includes potential energy means to move said clear portion in the return direction.

49. A projection reader as defined in claim 16 in which the screen means comprises a screen portion and said clear portion, and in which at least a part of the screen portion is transparent and colored.

50. A projection reader as defined in claim 16 in which the screen means comprises a screen portion and said clear portion, and in which at least a part of the screen portion is transparent and diffusing.

51. A projection reader including a light source and a projection lens system comprising: means for supporting in projection position a film having a plurality of line spaces comprising reading material to be projected, means for advancing said film, controlled by speed governor means, and mask means comprising a slanted transverse light transmitting area with a first end in substantial alignment with an end of one of said line spaces when a second end of said transverse light transmitting area is in substantial alignment with an end of another of said line spaces adjacent to said first mentioned line space.

References Cited

UNITED STATES PATENTS

| | | |
|---|---|---|
| 2,252,726 | 8/1941 | Peck. |
| 2,662,307 | 12/1953 | Simpson _____ 35—35.2 |
| 2,986,968 | 6/1961 | Kropp et al. |
| 3,023,931 | 3/1962 | Carlson _____ 221—243 |
| 3,179,004 | 4/1965 | Stoyanoff et al. ___ 35—35.2 XR |

NORTON ANSHER, Primary Examiner

ROBERT P. GREINER, Assistant Examiner

U.S. Cl. X.R.

35—9, 35, 39; 352—104